(12) United States Patent
Schovain

(10) Patent No.: US 10,882,650 B2
(45) Date of Patent: Jan. 5, 2021

(54) CARBONATION PRESERVATION DEVICE

(71) Applicant: Daniel Schovain, Western Springs, IL (US)

(72) Inventor: Daniel Schovain, Western Springs, IL (US)

(73) Assignee: Daniel Schovain, Western Springs, IL (US)

(*) Notice: Subject to any disclaimer, the term of this patent is extended or adjusted under 35 U.S.C. 154(b) by 0 days.

(21) Appl. No.: 16/191,800

(22) Filed: Nov. 15, 2018

(65) Prior Publication Data

US 2019/0084704 A1 Mar. 21, 2019

Related U.S. Application Data

(63) Continuation of application No. 15/897,484, filed on Feb. 15, 2018, now Pat. No. 10,160,560.

(60) Provisional application No. 62/459,434, filed on Feb. 15, 2017.

(51) Int. Cl.
| | |
|---|---|
| *B65B 31/04* | (2006.01) |
| *B65D 81/20* | (2006.01) |
| *A23L 2/44* | (2006.01) |
| *B65D 81/24* | (2006.01) |

(52) U.S. Cl.
CPC ............. *B65B 31/04* (2013.01); *A23L 2/44* (2013.01); *B65B 31/041* (2013.01); *B65B 31/047* (2013.01); *B65D 81/2076* (2013.01); *B65D 81/24* (2013.01)

(58) Field of Classification Search
CPC ........ B67D 1/0406; B65B 31/04; B65B 31/06
See application file for complete search history.

(56) References Cited

U.S. PATENT DOCUMENTS

| | | | |
|---|---|---|---|
| 1,263,278 A * | 4/1918 | Parker ................ | B01F 3/04801 141/17 |
| 4,867,209 A * | 9/1989 | Santoiemmo ....... | B01F 3/04801 141/19 |
| 9,751,743 B2 | 9/2017 | Taradalsky et al. | |
| 2011/0204093 A1* | 8/2011 | Lee .................... | B67D 1/0004 222/152 |

OTHER PUBLICATIONS

"Zzysh Champagne Preserver—Set", available at https://us.zzysh.me/product/champagne-preservation-system/; Apr. 25, 2019.

* cited by examiner

*Primary Examiner* — Timothy P. Kelly

(57) ABSTRACT

The present disclosure provides a carbonation preservation device that attaches to the mouth of an open container holding carbonated liquid. More specifically, the present invention relates to a device for preventing loss of carbonation from a carbonated liquid stored within a container by purging the trapped air above the remaining liquid within the container and replacing it with carbon dioxide or mixture of gases. When in place, the carbonation preservation device purges the air and other gases from the volume above the remaining carbonated liquid and fills the volume with a gas, such as carbon dioxide, or a mixture of gases, in order to pressurize the container and prevent the escape of carbon dioxide from the remaining carbonated liquid in the container.

2 Claims, 8 Drawing Sheets

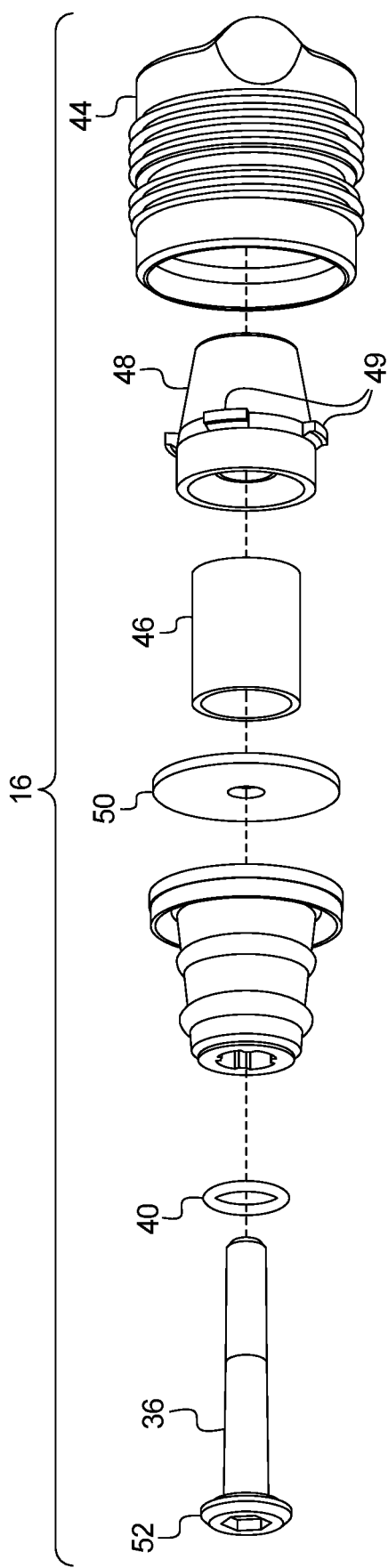
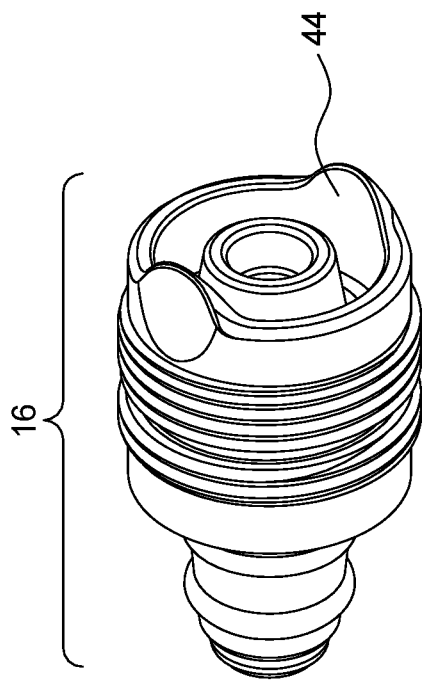

US 10,882,650 B2

CARBONATION PRESERVATION DEVICE

CROSS-REFERENCE TO RELATED APPLICATIONS

This application is a continuation of U.S. patent application Ser. No. 15/897,484 filed Feb. 15, 2018, which incorporates by reference and claims the benefit of priority to U.S. Provisional Application 62/459,434 filed on Feb. 15, 2017.

BACKGROUND OF THE INVENTION

The present invention relates to a device for preserving a carbonated beverage or liquid stored inside of its original container.

Carbonated beverages, such as soda, seltzer water, juices, beer, and champagne, are typically provided in an air tight can or bottle package for the preservation of compressed carbon dioxide. In some situations, a consumer has to finish the entire beverage immediately, otherwise all the compressed carbon dioxide in the remainder of the liquid will escape to the atmosphere after a while, and the remaining beverage will become flat.

For bottled carbonated beverages, if the consumer cannot finish the entire beverage soon after it is opened, regardless of whether the bottle is resealed, the remaining carbonated beverage will lose at least some of its carbonation due to the loss of gaseous carbon dioxide naturally released from the bottled beverage after opening. Further, gaseous carbon dioxide is lost into the growing space above the surface of the beverage during the course of consumption, whether the bottle is sealed or unsealed.

For example, prior to opening, a carbonated liquid sealed within a container is pressurized by carbon dioxide or another gas that causes the carbon dioxide of the carbonated liquid to remain in solution. Once the cap is opened, the carbon dioxide begins to escape from the liquid. After opening, even after resealing, the volume above the remaining liquid within the container is a mixture of gases including oxygen at levels that allow for the carbon dioxide to escape from the liquid. Alcoholic or otherwise carbonated liquids left open for a sufficient period lose their carbonation and become oxidated, which causes the liquid to become stale and deprives the consumer of the liquid's intended taste.

Accordingly, there is a need for a device that prevents carbon dioxide from escaping a carbonated liquid once the container in which it was originally sealed has been opened.

BRIEF SUMMARY OF THE INVENTION

To meet the needs described above and others, the present disclosure provides a carbonation preservation device that attaches to the mouth of an open container holding carbonated liquid. More specifically, the present invention relates to a device for preventing the loss of carbonation from a carbonated liquid within a bottle, such as a soda bottle, beer bottle, and/or a champagne bottle, by purging the trapped oxygen and replacing it with carbon dioxide or another gas. When in place, the carbonation preservation device purges the oxygen and other gases from the volume above the remaining carbonated liquid and fills the volume with a gas, such as carbon dioxide, or a mixture of gases, in order to pressurize the container and prevent the escape of carbon dioxide from the remaining carbonated liquid in the open or resealable container.

The carbonation preservation device includes a purger unit that houses a gas canister and engages a stopper assembly that is inserted into the mouth of the open container. The purger unit includes a piercer that is secured to a valve (e.g., Schrader valve), which pierces the gas canister's cap, thereby releasing the gas stored within the gas canister. The stopper assembly includes a final valve stroke that actuates the valve. A clamping assembly secures the stopper assembly to the mouth of the bottle.

The objective of the invention is to cap a previously-opened container and fill the volume above the remaining carbonated liquid with carbon dioxide or other gas to help maintain the carbonation of the beverage in the container.

An advantage of the present invention is that the remaining carbonated liquid maintains a carbonated state.

An object of the invention is to append a gas canister to an open liquid container to fill the container with a gas that helps preserve the carbonation of the liquid.

An advantage of the invention is that it provides a method for displacing the volume of air above the remaining liquid in an open container with carbon dioxide or other gas, allowing for the preservation of carbonation within the remaining liquid.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIGS. 8A-8B are an exploded view and perspective view, respectively, of the stopper assembly of the stopper unit of the carbonation preservation device.

DETAILED DESCRIPTION OF THE INVENTION

Figure 1:
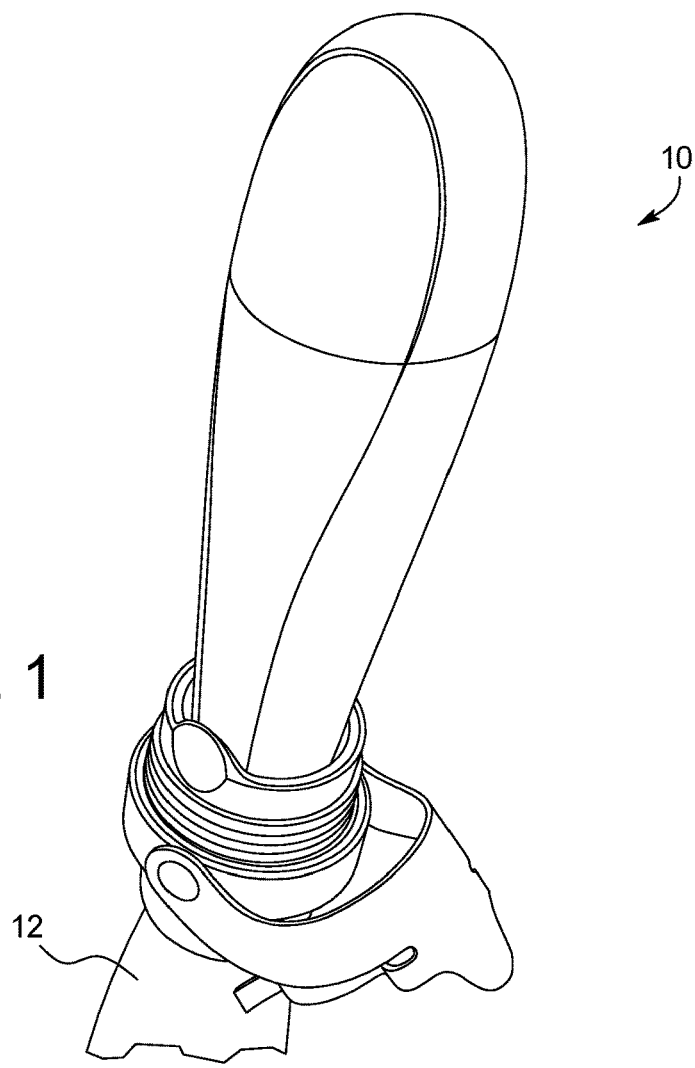
FIG. 1 is a perspective view of an example of the carbonation preservation device of the present application.

The present invention discloses a carbonation preservation device 10 for preventing oxidation and preserving carbonation of opened carbonated liquid containers as shown in FIG. 1. Although the illustrated example refers to a bottle as the container, the present disclosure can be used in combination with any shape or type of container, not limited to containers for liquid drinks. Further, the device can be used with containers storing non-carbonated liquids, gels, solutions, solids, among others. Once secured to the mouth of a previously-opened container 12, the carbonation preservation device 10 of the present application injects gas, or a mixture of gases, to occupy the volume between the remaining liquid and the cap to assist in maintaining the carbonation in the liquid. In an example, the gas, or mixture of gases, includes carbon dioxide and/or other food-grade gases approved by the Food and Drug Administration or similar regulatory body.

Figure 2:
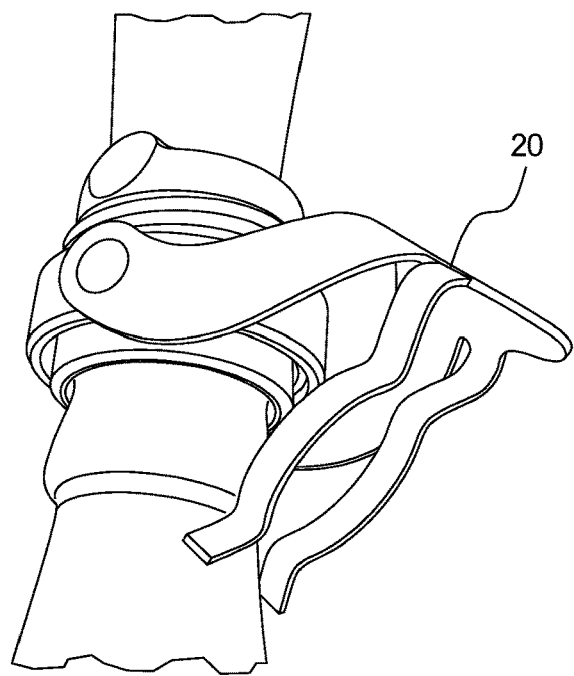
FIG. 2 is a perspective view of an example of a clamping device used to connect the carbonation preservation device to a bottle.
Figure 3:
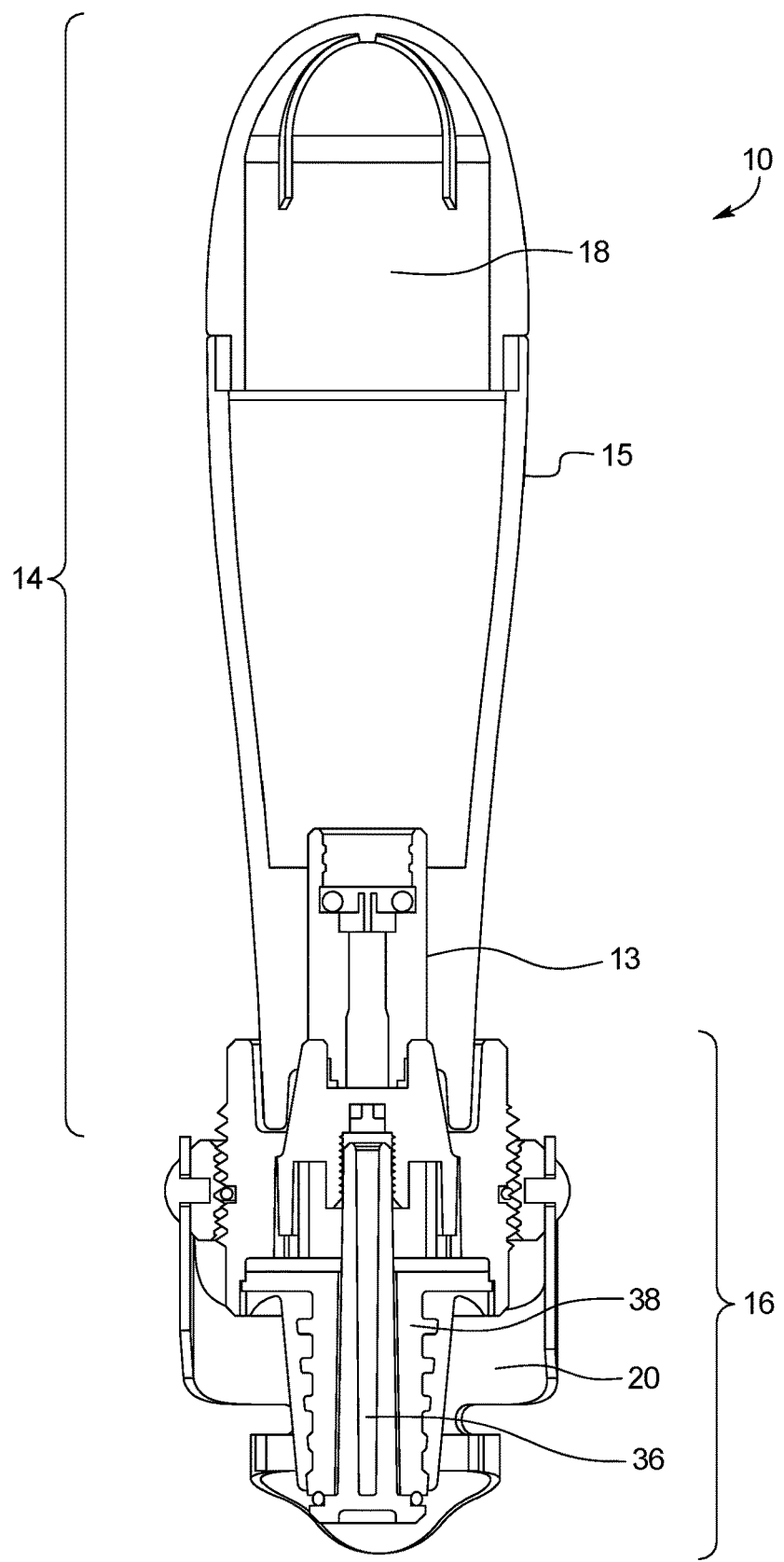
FIG. 3 is a sectional view of the carbonation preservation device.
Figure 4:
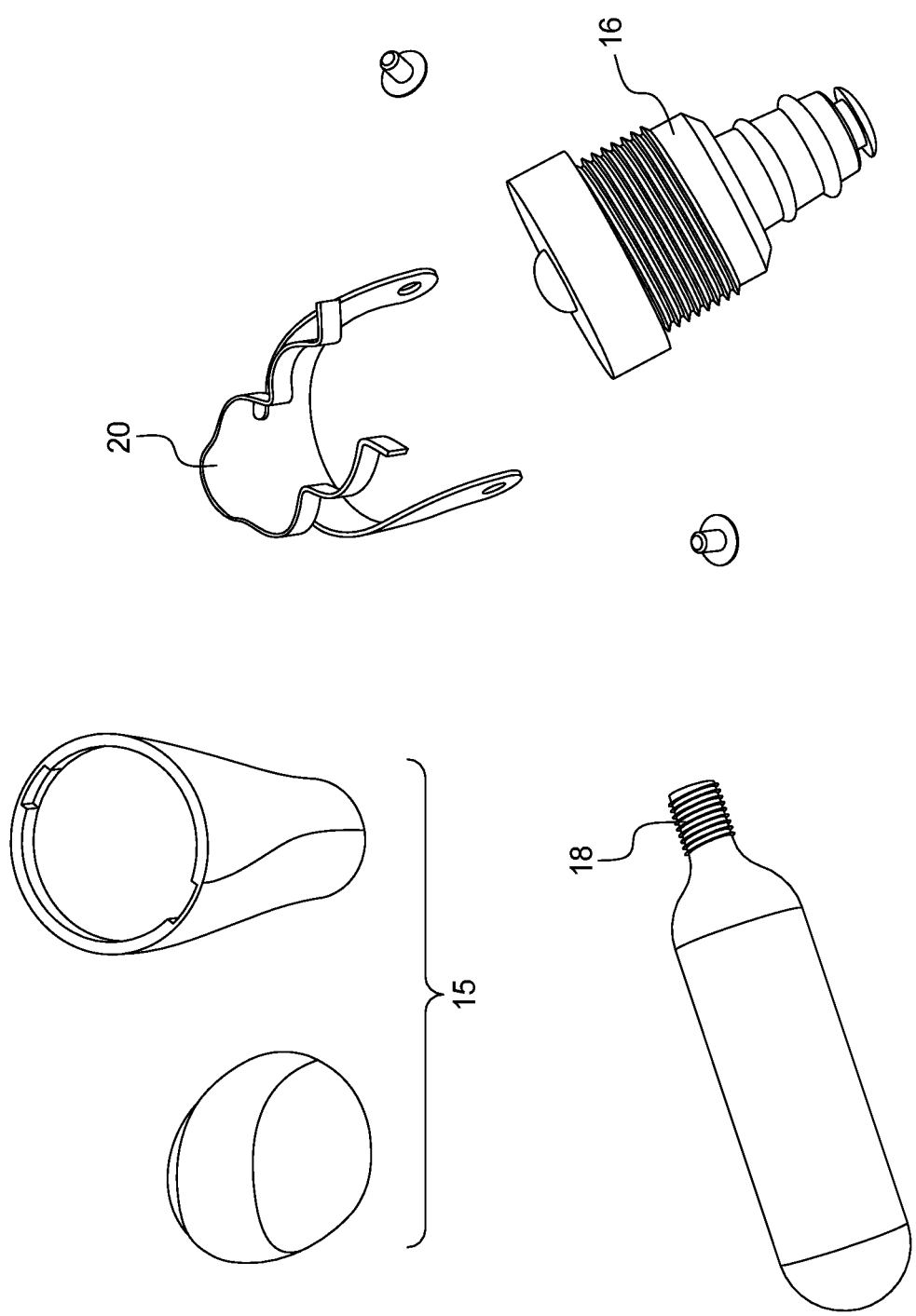
FIG. 4 is an exploded view of various elements of the carbonation preservation device.

Referring to FIG. 3, the carbonation preservation device includes a purger unit 14 that includes a stopper valve 13. A gas canister 18 is loaded into the purger unit, as shown in FIG. 3, and a gas, such as carbon dioxide, is released into the bottle through the stopper valve 13, as shown in FIG. 4. Alternatively, instead of a gas cartridge positioned within the purger unit 14, the purger unit 14 may include an adapter to receive pressurized gas from an external source such as an external carbon dioxide source (e.g., external cartridge). As shown in FIG. 2, the stopper unit 16 can include a stopper valve that allows gas from the gas canister 18 to flow into the stopper unit 16 and ultimately into the bottle. A clamp assembly 20 can secure the carbonation preservation device 10 to the mouth of a bottle 12. In an example, the stopper unit 16 includes an adjustable ring around a stopper assembly that engages with the clamp assembly. The clamp assembly allows the stopper assembly to be secured to the mouth of the bottle.

To operate the carbonation preservation device 10, the stopper unit 16 is inserted into the mouth of a liquid container. The clamp assembly 20 is compressed towards the body of the liquid container to secure the carbonation preservation device 10 to the container 12 and the purger unit 14 mates with the stopper unit 16. Downward pressure applied to the purger unit 14 releases the gas from the gas canister 18.

Figure 5:
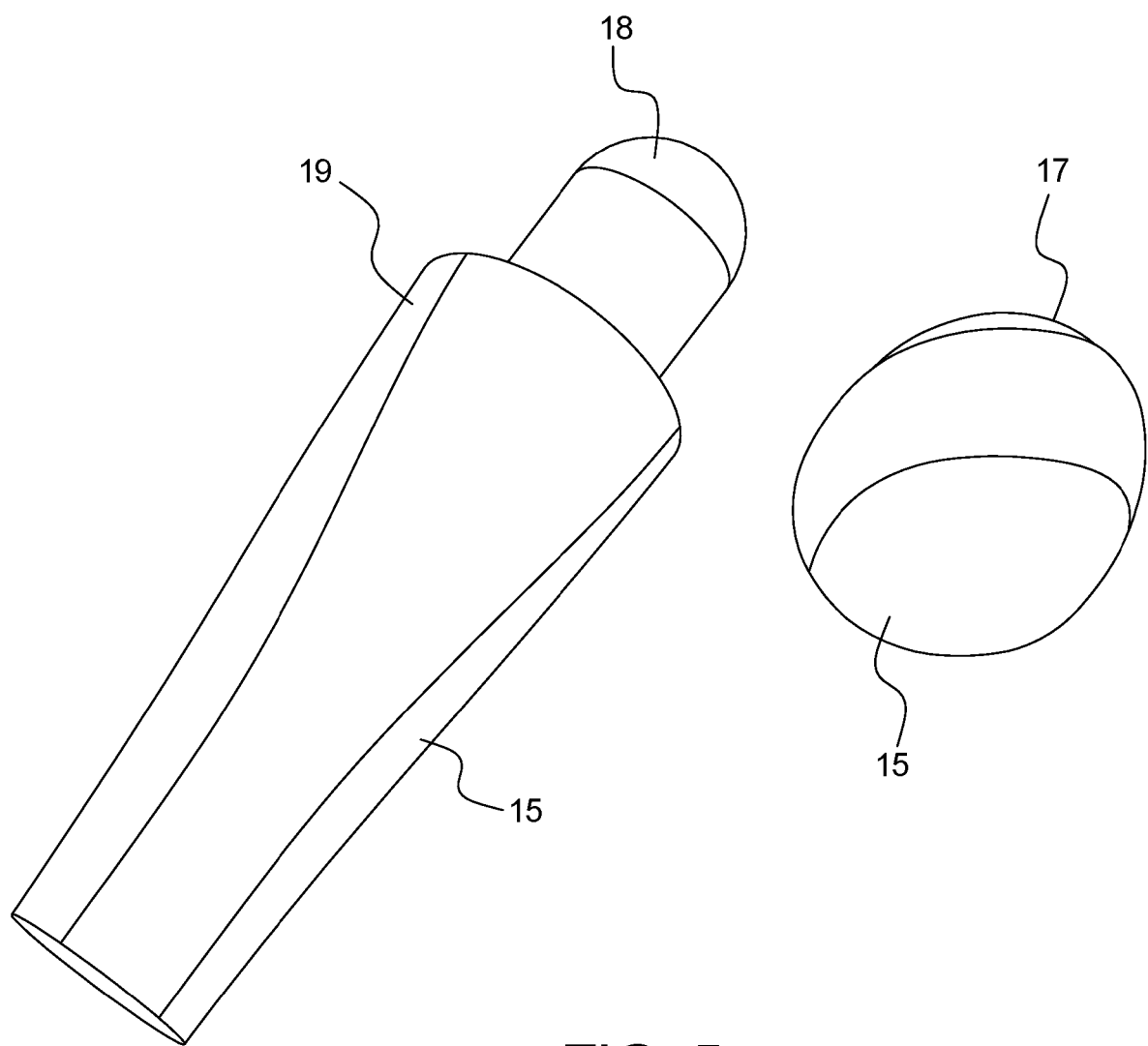
FIG. 5 illustrates an example of the purger unit engaged with a gas canister.
Figure 6:
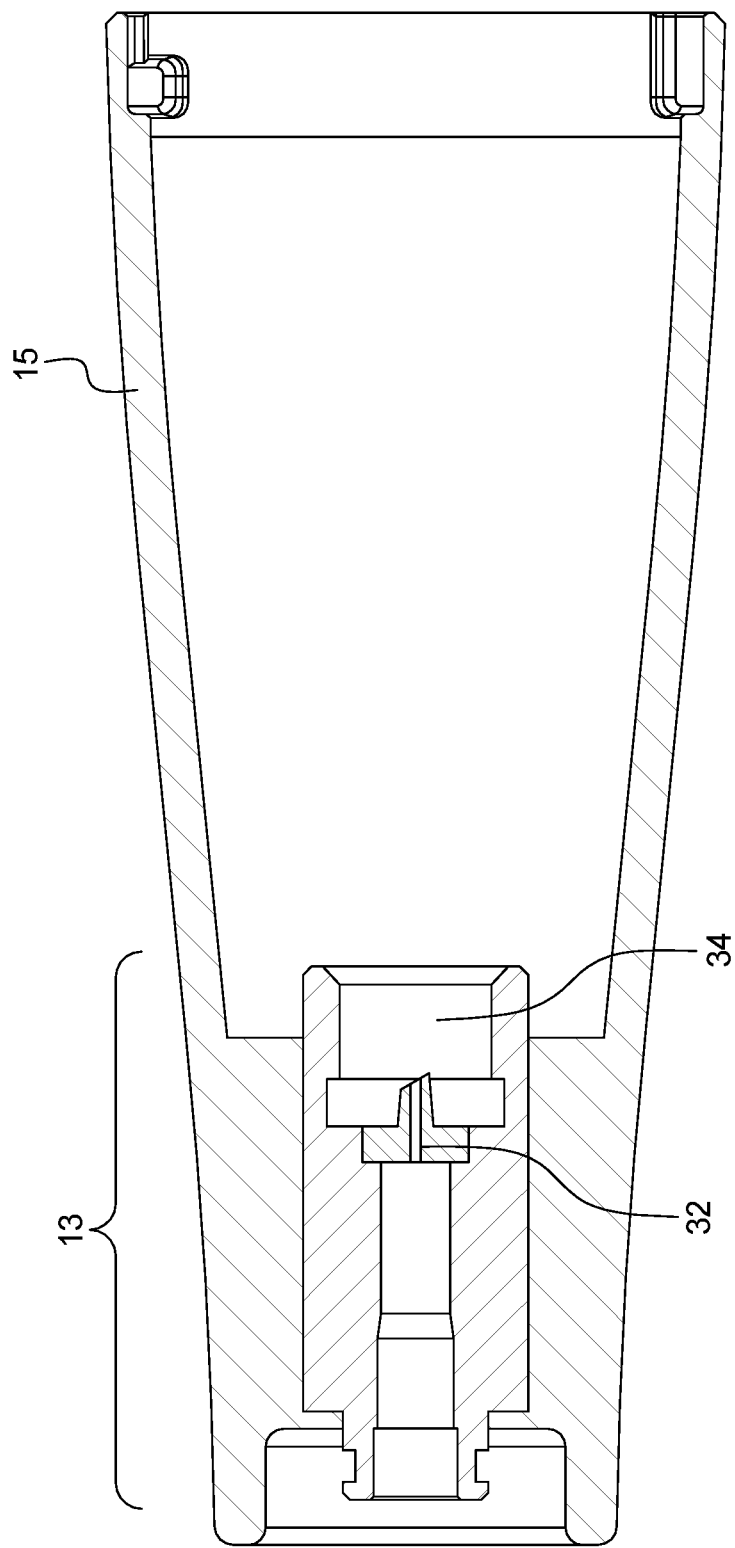
FIG. 6 is a sectional view of the purger unit of the carbonation preservation device.

The purger unit 14 functions has a housing (e.g., handle) in which the gas canister 18 is stored as it is secured atop the stopper unit 16, as detailed in FIG. 3. The purger housing 15 of the purger unit 14 tapers from top to bottom such as to form a tapered cylindrical shape. The interior of the housing 15 is hollowed between first and second circular openings. As shown in FIG. 5, the housing 15 can separate into a cap 17 that attaches to a lower end 19 of the purger housing 15 to encase the gas canister 18. The cap 17 can be circular when viewed top-down can taper down to a smaller circular circumference on the opposite end so as to fit into the opening of the purger housing 15.

The cap 17 and lower end 19 can fit together via a locking method (e.g., screwing, snapping, pressure fit, etc.). Two protruding pieces from the cap 17 can be received by two indentations in the lower end 19 of the purger housing 15. In an example, when twisted, the cap 17 and the lower end 19 of the purger housing 15 can interlock and are secured together. In one embodiment, the lower end 19 of the purger housing 15 and cap 17 may be made of acrylonitrile butadiene styrene (ABS). Of course, numerous known substitute materials may be used, as will be recognized by those skilled in the art.

In an example, the lower end 19 of purger housing 15 can include a stopper valve 13 (e.g., a pneumatic Schrader valve) and mates with the stopper unit 16 via an inner, annular lip to the opening of the container 12. At the opposite end of the stopper valve 13, a piercer 32 can be positioned atop an insert 34 immediately below the gas canister. When the gas canister is screwed into position via the brass insert 34, it forces contact with the piercer 32 to enable the stopper valve 13 to regulate flow from the gas canister. During use, the application of downward pressure to the purger unit results in the opening of the stopper valve 13 (e.g., Schrader valve), releasing gas through the lower end of the purger housing 15. Once the downward pressure is removed, the stopper valve 13 returns to a closed state, sealing the gas canister. An O-ring (not pictured) positioned between the canister cap and the piercer 32 can maintain a minimal spacing so that the piercer 32 does not cause gas to be released when the stopper valve 13 is inactive. In one embodiment, the O-ring is circular in shape and made of rubber. While the primary example of a carbonation preservation device described herein utilizes a Schrader valve, any suitable valve (e.g., pressure-activated valve, twist valve, etc.) or similar flow control device may be incorporated into the carbonation preservation device. Still further, while the illustrated embodiment utilizes specific components to inject gas, other suitable components using similar or different mechanisms as the illustrated embodiment may be used to inject gas into the volume above the remaining carbonated liquid in the open container.

Figure 7:
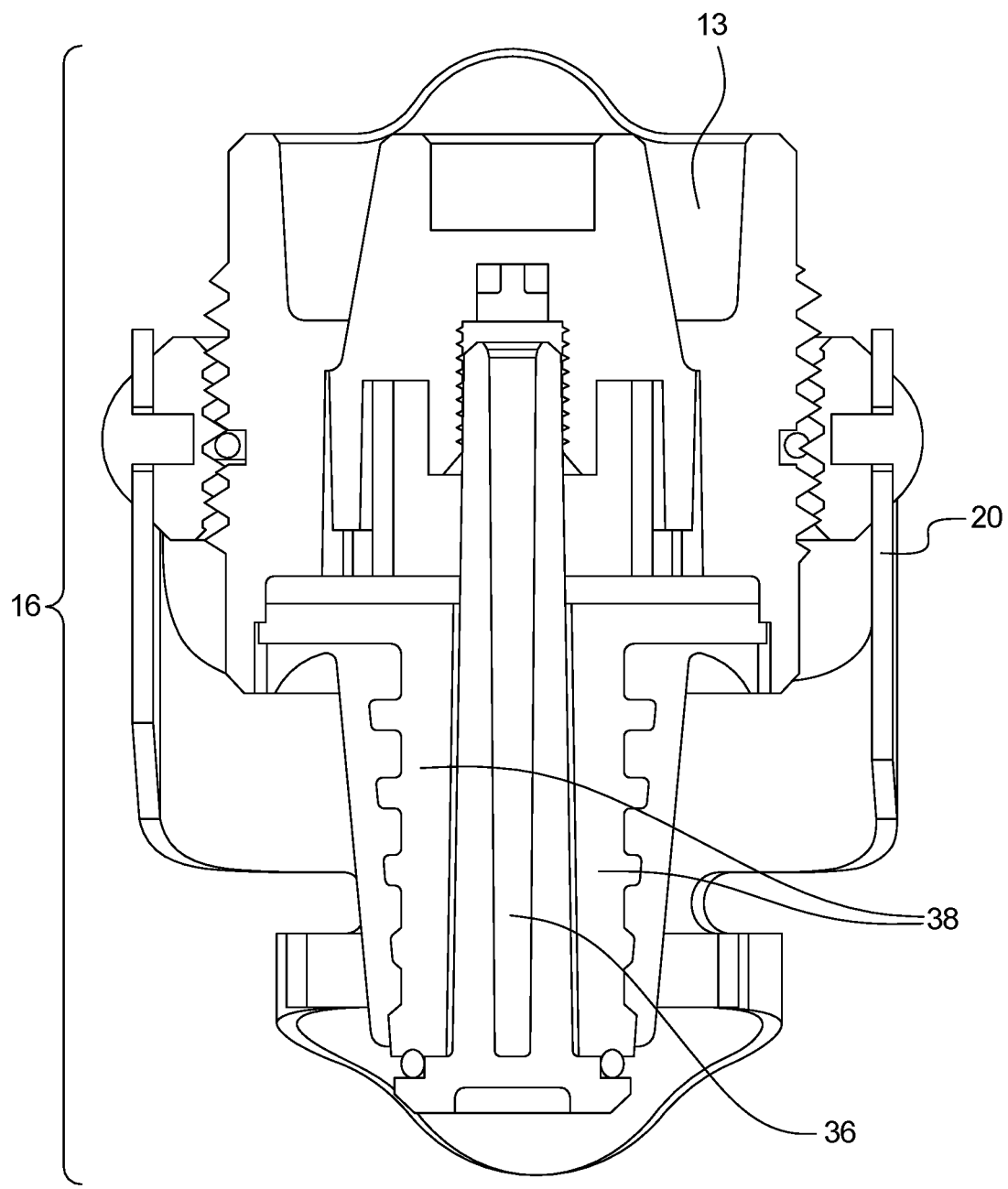
FIG. 7 is a sectional view of the stopper assembly of the carbonation preservation device.

Referring to FIG. 7, the stopper unit 16 allows for the removal of oxygen and other gases from the container and ensures a tight seal. For example, a final valve stroke 36 moves vertically within a stopper unit 16 positioned within a stopper housing of the stopper assembly. Upon pressure applied to the purger unit 14, the final valve stroke 36 moves downward while the stopper housing remains in place and compresses the Schrader valve. The stopper unit 16 is substantially cylindrical with a threaded outer surface and includes two opposing semi-ovular gripping surfaces. The stopper housing and bottom can be made of ABS plastic, A70 silicone, or any suitable material.

The stopper unit 16 is cylindrical in shape and includes an inner stopper bottom within an outer stopper bottom. The exterior surfaces of the inner and/or outer stopper bottom pieces can be ribbed to tightly seal against the inside of the mouth and neck of the bottle 12. The stopper unit 16 can include a central void through which the final valve stroke 36 moves. The central void can include a circular in shape, with four longitudinal protrusions milled from the surface surrounding the void so as to form four semi-circular cut-outs at equidistance from the center of the shaft. A rubber gasket made of BNR, A80, or similar material, can be positioned between the stopper bottom and the stopper housing.

The final valve stroke 36 can include a larger disk surface 52 at a lower end and tapers to the upper end into a circular base of smaller radius. An O-ring 40 can be positioned atop an annular lip extending outwardly at the lower end of the final valve stroke 36. A central bore extends between the upper end to the larger disk surface and connects to a relief opening through the side of the final valve stroke 36.

Gas released from the gas canister moves through the stopper valve 13 into the central bore of the stopper unit 16 and through the relief opening of the final valve stroke 36 into the container 12. While the carbonation preservation device 10 of the illustrated embodiment includes the final valve stroke 36, other embodiments of the carbonation preservation device 10 may include a different mechanism as a substitution for the final valve stroke 36 or may operate without an analogous component.

In an example, the stopper unit 16 also includes at least one vent 38 that allows the air in the volume above the remaining liquid in the container 12 to exit the container 12 as gas from the gas canister enters the volume. While the illustrated embodiment utilizes specific components to perform the release and/or purging of air, other suitable components using similar or different mechanisms as the illustrated embodiment may be used to remove air from the volume above the remaining carbonated liquid in the open container.

As shown in FIGS. 8A-8B, the stopper unit 16 can also include a mating lip 44. The mating lip can be positioned atop the final valve stroke 36 just below an upper end of the stopper unit 16. The mating lip can be composed of a cylindrical surface 46 attached to a conical surface 48, the opening of which is a circular space with smaller radius than the opening of the cylindrical surface. A centrally-located planar surface 50 recessed from the upper edge of the mating lip can receive the stopper valve 13 of the purger unit 14. An O-ring 40, or other mechanism and/or material, may be positioned between the planar surface 50 of the mating lip and the stopper valve 13 to improve the seal. The final valve stroke 36 can contact the side of the planar surface opposite of the stopper valve 13. Along the exterior of the mating lip, there are four protruding pieces 49, each equidistant about the external cylindrical surface. The mating lip can be made of a food-grade material, e.g., ABS.

Figure 9:
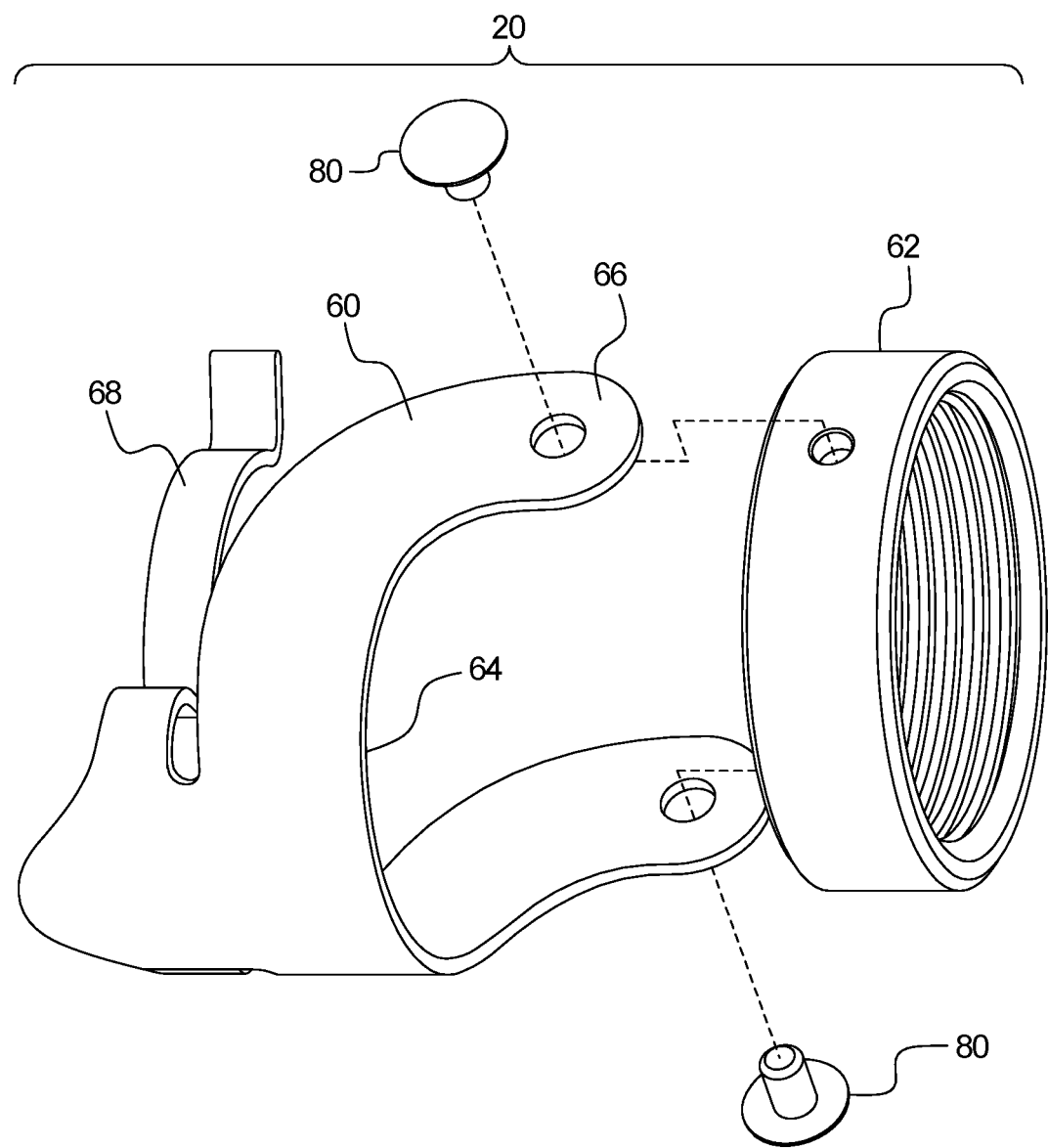
FIG. 9 is an exploded view of an example of a clamp assembly.

As shown in FIG. 9, the clamp assembly 20 includes a clamp 60 that is coupled to an adjustment ring 62. The threaded, inner surface of the adjustment ring 62 can attach to the stopper unit 16, e.g., via mating lip 44. The clamp 60 can include a bottle neck portion 68 and two arms 66 extending from a base portion 64. The bottle neck portion 68 snap-fits onto the neck of the bottle just below the mouth, and the two arms 66 extend to either side of the adjustment ring 60. The adjustment ring is secured to the clamp by two rivet pins 80 or other fasteners that extend through opposing openings on the adjustment ring and aligned openings on arms of the clamp. The adjustment ring can be made of any suitable material, including, but not limited to Aluminum 5202. The clamp may be made of a metallic substance, polymeric substance, among other materials.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A carbonation preservation device for preserving carbonation of a carbonated beverage in a container after opening, the container and air located within a volume above the carbonated beverage, the carbonation preservation device comprising:
    a purger unit including:
        a housing configured to store a compressed gas canister including a compressed gas;
        a stopper valve at a lower end of the housing; and
        a piercer at an opposite end of the valve;
        wherein the purger unit is configured such that when the compressed gas canister is positioned within the housing, the piercer pierces the compressed gas canister, thereby allowing the stopper valve to regulate flow of the compressed gas from the compressed gas canister; and
    a stopper unit selectively mates with the purger unit, wherein the stopper unit is configured to insert into the opening of the bottle and removably attach to the bottle, the stopper unit including:
        a final valve stroke that moves vertically within the stopper; and
        at least one vent;
    wherein, when the stopper unit is inserted into the opening of the bottle and secured to the bottle, and the compressed gas cylinder is located within a cavity in the purger unit, and the purger unit is mated with the stopper unit, upon pressure applied to the purger unit, the compressed gas is released from the compressed gas cylinder, the compressed gas flows from the purger unit into the stopper unit, the final valve stroke moves downward allowing the compressed gas to flow into the bottle, simultaneously, at least a portion of the air located within the volume above the carbonated beverage flows out of the bottle through the at least one vent in the stopper unit, and the air flowing out of the bottle through the at least one vent is replaced in the volume above the carbonated beverage by the compressed gas flowing into the bottle.

2. The carbonation preservation device of claim 1, wherein the stopper unit further comprises a clamp assembly that, in use, removably attaches the stopper unit to the opening of the bottle.

* * * * *